(12) United States Patent
Fujimoto et al.

(10) Patent No.: US 6,191,903 B1
(45) Date of Patent: Feb. 20, 2001

(54) RECORDING MEDIUM, DATA TRANSMISSION APPARATUS, DATA RECEIVER, AND OPTICAL DISK UNIT

(75) Inventors: Kensuke Fujimoto; Masahiro Shigenobu, both of Kanagawa; Hideki Mawatari, Chiba, all of (JP)

(73) Assignee: Sony Corporation, Tokyo (JP)

(*) Notice: Under 35 U.S.C. 154(b), the term of this patent shall be extended for 0 days.

(21) Appl. No.: 09/132,637

(22) Filed: Aug. 11, 1998

(30) Foreign Application Priority Data

Aug. 14, 1997 (JP) .................................................. 9-219334

(51) Int. Cl.⁷ .................. G11B 5/09; H04N 5/76
(52) U.S. Cl. ............................... 360/48; 369/59
(58) Field of Search .................. 360/48, 59, 51; 369/48, 59

(56) References Cited

U.S. PATENT DOCUMENTS 5,917,792  6/1999  Shigenobu et al. ............... 369/59

FOREIGN PATENT DOCUMENTS

0756279 A2   1/1997   (EP) .............................. G11B/20/00
0779623 A2   6/1997   (EP) .............................. G11B/20/14

OTHER PUBLICATIONS

H. Ooki, "Logical Format of DVD," IEEE International Conference on Consumer Electronics, 1996 Digest of Technical Papers, Jul. 5–7, 1996, pp. 350–351.

Primary Examiner—W. Chris Kim
(74) Attorney, Agent, or Firm—Limbach & Limbach, LLP

(57) ABSTRACT

This invention relates to a recording medium, data transmission apparatus, data receiver, and optical disk unit, and particularly applies to a system which transmits video data and other data or records them on an optical disk in a predetermined block unit, and permits each frame to be easily and correctly located by low volumes of identification data. At least contiguous synchronization patterns or/and contiguous synchronization patterns with one synchronization pattern interleaved therebetween are assigned with unique combinations.

23 Claims, 13 Drawing Sheets

FIG. 1

| | | | |
|---|---|---|---|
| SY0 | ID: | SY4 | |
| SY1 | | SY5 | |
| SY2 | | SY6 | |
| SY0 | | SY5 | |
| SY3 | | SY5 | |
| SY1 | | SY4 | |
| SY0 | | SY6 | |
| SY2 | | SY7 | |
| SY1 | | SY7 | |
| SY3 | | SY6 | |
| SY3 | | SY4 | |
| SY2 | | SY4 | |
| SY3 | | SY7 | |

Sector (vertical extent of the table)

FIG. 3
| SY0 | 000100100100100 | 00000000000010001 |
|-----|-----------------|-------------------|
| SY1 | 000001000000100 | 00000000000010001 |
| SY2 | 000100000000100 | 00000000000010001 |
| SY3 | 000010000000100 | 00000000000010001 |
| SY4 | 001000000000100 | 00000000000010001 |
| SY5 | 001000100100100 | 00000000000010001 |
| SY6 | 001001001000100 | 00000000000010001 |
| SY7 | 001001000100100 | 00000000000010001 |
FIG. 4
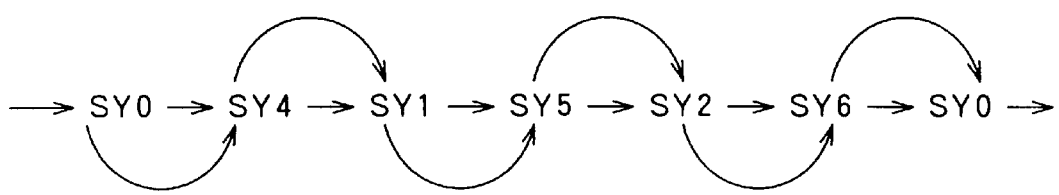
FIG. 5
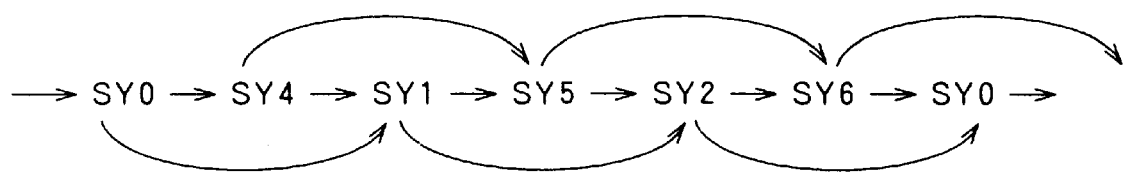

FIG. 7

| | | | |
|---|---|---|---|
| SY0 | ID | SY5 | |
| SY1 | | SY6 | |
| SY2 | | SY7 | |
| SY3 | | SY8 | |
| SY1 | | SY7 | |
| SY4 | | SY7 | |
| SY2 | | SY6 | |
| SY1 | | SY8 | |
| SY3 | | SY5 | |
| SY2 | | SY5 | |
| SY4 | | SY8 | |
| SY4 | | SY6 | |
| SY3 | | SY6 | |

Sector

FIG. 8

| | | | |
|---|---|---|---|
| SY0 | ID | SY1 | |
| SY1 | | SY2 | |
| SY1 | | SY3 | |
| SY4 | | SY2 | |
| SY2 | | SY4 | |
| SY1 | | SY5 | |
| SY3 | | SY5 | |
| SY1 | | SY4 | |
| SY5 | | SY6 | |
| SY6 | | SY2 | |
| SY3 | | SY2 | |
| SY7 | | SY6 | |
| SY3 | | SY7 | |

Sector

FIG. 9

| | | | |
|---|---|---|---|
| SY0 | ID | SY2 | |
| SY1 | | SY5 | |
| SY4 | | SY2 | |
| SY5 | | SY2 | |
| SY4 | | SY4 | |
| SY1 | | SY4 | |
| SY5 | | SY3 | |
| SY5 | | SY5 | |
| SY1 | | SY3 | |
| SY3 | | SY4 | |
| SY3 | | SY2 | |
| SY2 | | SY3 | |
| SY1 | | SY1 | |

Sector

F I G. 11
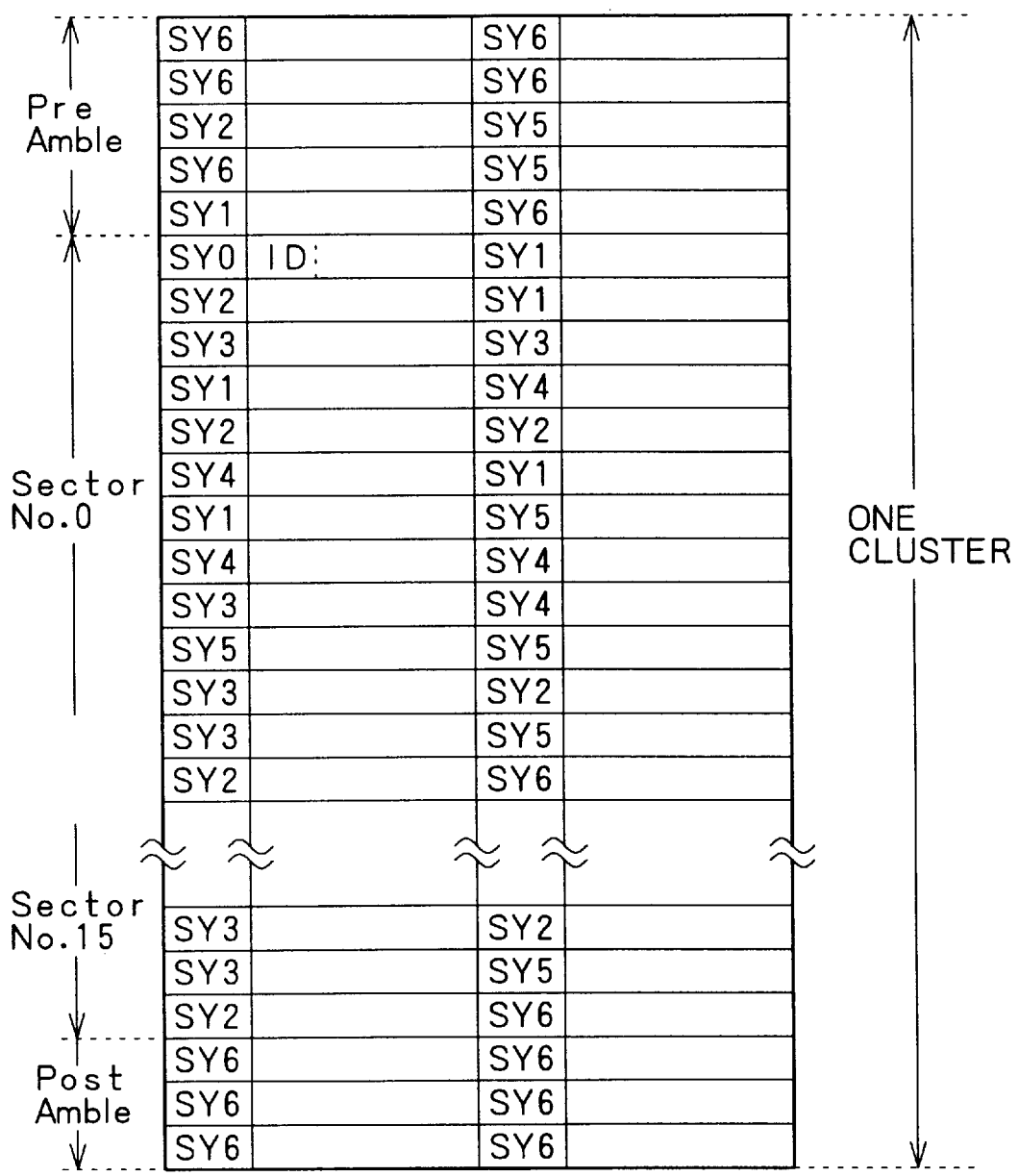

FIG. 12

| NUMBER OF FRAMES n | i | PATTERN |
|---|---|---|
| 3 | 2 | 010 |
| 4 | 3 | 0120 |
| 5 | 3 | 01210 |
| 6 | 3 | 012210 |
| 7 | 4 | 0132210 |
| 8 | 3 | 01211020 |
| 9 | 4 | 013231210 |
| 10 | 4 | 0132331210 |
| 11 | 4 | 01332311210 |
| 12 | 4 | 013202231210 |
| 13 | 4 | 0133022311210 |
| 14 | 4 | 01332022311210 |
| 15 | 4 | 013302032311210 |
| 16 | 5 | 0123402033132210 |
| 17 | 5 | 01234402033132210 |
| 18 | 5 | 012340242033132210 |
| 19 | 5 | 0123340242043132210 |
| 20 | 5 | 01233414402043132210 |
| 21 | 5 | 012340242030433132210 |
| 22 | 5 | 0123340242043114132210 |
| 23 | 5 | 01233034402043114132210 |
| 24 | 5 | 012332024403043134142210 |
| 25 | 5 | 0122043233414403024211310 |
| 26 | 6 | 01400323124434115225335455 |
| 27 | 6 | 010042023124434115225335455 |
| 28 | 6 | 0140210323124434115225335455 |
| 29 | 6 | 01004202303124434115225335455 |
| 30 | 6 | 013104200514024434115225335455 |
| 31 | 6 | 0130040210323124434115225335455 |
| 32 | 6 | 01312423032040051434115225335455 |

FIG. 13

| NUMBER OF FRAMES n | i | PATTERN |
|---|---|---|
| 33 | 6 | 013032044231240051434115225335455 |
| 34 | 6 | 0103200514043024423134115225335455 |
| 35 | 6 | 01204321030242313400514115225335455 |
| 36 | 6 | 013032044231210400514341152253354555 |
| 37 | 7 | 0131005021434125235545116226336446566 |
| 38 | 7 | 01400615320434125235545116226336446566 |
| 39 | 7 | 013032005021434125235545116226336446566 |
| 40 | 7 | 0131042005021434125235545116226336446566 |
| 41 | 7 | 01310420050214034125235545116226336446566 |
| 42 | 7 | 010061530240320434125235545116226336446566 |
| 43 | 7 | 0131006153020424034125235545116226336446566 |
| 44 | 7 | 01241432105303400615025235545116226336446566 |
| 45 | 7 | 010420053214340313024125235545116226336446566 |
| 46 | 7 | 0131040321434200615024125235545116226336446566 |
| 47 | 7 | 01402503006153212410520434235545116226336446566 |

FIG. 14

| NUMBER OF FRAMES n | i | PATTERN |
|---|---|---|
| 3 | 2 | 011 |
| 4 | 3 | 0112 |
| 5 | 3 | 01221 |
| 6 | 4 | 013211 |
| 7 | 4 | 0123211 |
| 8 | 4 | 01223211 |
| 9 | 4 | 011323312 |
| 10 | 4 | 0123313221 |
| 11 | 5 | 01244313211 |
| 12 | 5 | 014424313211 |
| 13 | 5 | 0123424313211 |
| 14 | 5 | 01234424313211 |
| 15 | 5 | 012334244313211 |
| 16 | 5 | 0143342441223211 |
| 17 | 5 | 01434412423313221 |
| 18 | 6 | 013442541431223211 |
| 19 | 6 | 0125414431334223211 |
| 20 | 6 | 03541552443134223211 |
| 21 | 6 | 015335254134314223211 |
| 22 | 6 | 0135334551542243123211 |
| 23 | 6 | 01552453354143134223211 |
| 24 | 6 | 015335414552443134223211 |
| 25 | 6 | 0135334551522544243123211 |
| 26 | 6 | 02154252441453551334322311 |
| 27 | 7 | 016266525513641542243123211 |
| 28 | 7 | 0366126533541552443134223211 |
| 29 | 7 | 01564453662651254143134223211 |
| 30 | 7 | 014645661653354152443134223211 |
| 31 | 7 | 0162566126533541552443134223211 |
| 32 | 7 | 01664635334552442651541431223211 |
| 33 | 7 | 015363561664144652451254334223211 |
| 34 | 7 | 0163662456552641461353154334223211 |
| 35 | 7 | 01624565336463552661254143134223211 |
| 36 | 7 | 012533623445664635524226515414313211 |

RECORDING MEDIUM, DATA TRANSMISSION APPARATUS, DATA RECEIVER, AND OPTICAL DISK UNIT

BACKGROUND OF THE INVENTION

1. Field of the Invention

This invention relates to a recording medium, data transmission apparatus, data receiver, and optical disk unit, and is particularly applicable to a system which transmits video data and other data or records them on an optical disk in a predetermined block unit. This invention permits each frame to be easily and correctly located by providing unique combinations for at least contiguous synchronization patterns or contiguous synchronization patterns with one synchronization pattern interleaved therebetween.

2. Description of Related Art

In a conventional optical disk unit, on the basis of synchronization patterns inserted between contiguous pieces of data, a clock out of synchronization is corrected so that the data can be correctly reproduced. Further, the optical disk unit is constructed so that the use of a combination of a plurality of types of synchronization patterns, which are fewer than the number of frames constituting one sector, helps to effectively avoid an increase in redundancy due to the synchronization patterns as well as to locate the frames on the basis of the result of reproducing the synchronization patterns.

Namely, a DVD (Digital Versatile Disc), an optical disk unit of this sort, for example, transforms video signals and audio signals successively inputted into digital signals to produce digital video signals and digital audio signals. Further, the optical disk unit subjects the digital video signals to data compression in accordance with a format defined in MPEG (Moving Picture Experts Group) and multiplexes them with the digital audio signals similarly subjected to data compression (hereinafter, the multiplexed data is called AV data), and then performs a scramble process.

Further, as shown in FIG. 15, after adding identification data indicating an address and other data to the AV data, the optical disk unit splits the AV data in a predetermined block unit, adds an error correction code, preamble, postamble, etc. to each block, generating one cluster of data from the data of these blocks. By this process, the optical disk unit records and reproduces AV data on and from an optical disk in units of error correction blocks consisting of one cluster. In FIG. 15, the number of frames is represented by the symbol Fr.

Further, the optical disk unit forms 16 sectors of data from one cluster of data, and as shown in FIG. 16, forms 26 sync frames of data from data of each sector. Each sync frame is formed with synchronization patterns SY0 to SY7 assigned to AV data or other data formed in units of 91 bytes.

In these DVDs, eight types of synchronization patterns SY0 to SY7 (hereinafter, referred to as first to eighth synchronization patterns) are successively assigned to the sync frames in a predetermined order. Namely, each sector begins with the first synchronization pattern SY0 to indicate the start of the sector, followed by the first sync frame consisting of ID data and other data. In the sector, the sixth synchronization pattern SY5 follows to form a sync frame with AV data and other data.

Further, the sector has the remaining 24 frames divided into three blocks, which have even frames assigned sixth, seventh, and eight synchronization patterns SY5, SY6, and SY7, respectively. The odd frames of each block are assigned second to fifth synchronization patterns SY1, SY2, SY3, and SY4 in this order.

With this arrangement, in a DVD, the synchronization patterns SY5, SY6, and SY7 of even frames help to distinguish among the first block, middle block, and last block of each sector, and the synchronization patterns SY0 to SY4 of odd frames help to identify a frame in each block, thereby making it possible to restore the data to be successively reproduced.

By this arrangement, in an optical disk unit of this sort, there are cases where data is reproduced from middle frames of a sector by a seek operation. Also, middle frames may not be correctly reproduced because of the occurrence of an out-of-synchronization condition due to a damage. To provide against such a circumstance, when data is to be reproduced from middle frames of a sector based on the result of reproducing synchronization patterns, the optical disk unit is constructed so that reproduction results can be outputted by correctly placing the data of frames successively reproduced even when the middle frames cannot be correctly reproduced.

Meanwhile, when the synchronization patterns SY0 to SY7 are assigned in this way, as shown by the arrow A, when data of a third frame of each sector is reproduced from data of a second frame, the sixth and second synchronization patterns SY5 and SY1 are contiguous. Also, as shown by the arrow B, when data of an eleventh frame is reproduced from data of a tenth frame, similarly, the sixth and second patterns SY5 and SY1 are contiguous.

Accordingly, in an arrangement of the synchronization patterns, when the sixth and second synchronization patterns SY5 and SY1 are contiguous, it is difficult to locate a frame from the sixth and second synchronization patterns SY5 and SY1 alone; eventually, it is difficult to correctly determine a frame until a synchronization pattern which follows is detected. Namely, it takes a long time to correctly locate a frame.

When the synchronization pattern of an odd frame of synchronization patterns that are contiguous in a stream of even, odd, and even frames could not be correctly reproduced, it can be determined which of the first, middle, and last blocks of a sector the frame exists in, but it is difficult to determine the specific location of the frame within the block; also in this case, it is difficult to correctly identify the frame until a synchronization pattern which follows is detected.

Namely, for example, if the second synchronization pattern SY1 cannot be correctly reproduced when the sixth, second, and sixth synchronization patterns SY5, SY1, and SY5 are contiguous, in FIG. 16, it is difficult to locate a specific sector in one of the following cases: when the sixth, second, and sixth synchronization patterns SY5, SY1, and SY5 are contiguous, when the sixth, third, and sixth synchronization patterns SY5, SY2, and SY5 are contiguous, when the sixth, fourth, and sixth synchronization patterns SY5, SY3, and SY5 are contiguous, and when the sixth, fifth, and sixth synchronization patterns SY5, SY4, and SY5 are contiguous.

Even when three contiguous synchronization patterns can be detected, if any of them is incorrectly detected, eventually, no correct frame can be located; also in this case, it is difficult to correctly identify the frame until a synchronization pattern which follows is detected.

In this case, one possible method is to assign a unique synchronization pattern to each sync frame, but this requires that the bit length of the synchronization pattern be longer accordingly, posing a problem in that redundancy is increased because of the synchronization patterns.

SUMMARY OF THE INVENTION

This invention has been made in consideration of the above-mentioned problems, and it is an object of this invention to offer a recording medium, data transmission apparatus, data receiver, and optical disk unit which permit frames to be easily and correctly located.

According to the invention to solve the above-mentioned problems, in a recording medium, data transmission apparatus, and optical disk unit, identification patterns that are fewer in type than the number of frames constituting one block are successively assigned to frames in such a manner that, when contiguous frames are arbitrarily selected in each block, a combination of identification patterns assigned to the contiguous frames is different from combinations of identification patterns assigned to any other contiguous frames in the block.

At this time, the identification patterns are assigned in such a manner that, when three contiguous frames are arbitrarily selected, a combination of the identification patterns assigned to the first and last frames of the three contiguous frames is different from combinations of the identification patterns assigned to the first and last frames of any other three contiguous frames.

Further, in a data receiver and optical disk unit containing data thus set, each frame is located based on the identification patterns of two contiguous frames or based on the identification patterns of three contiguous frames.

Even when identification patterns that are fewer in type than the number of frames constituting one block are successively assigned to frames to locate sync frames with effective avoidance of an increase in redundancy, if the identification patterns are assigned in such a manner that, when contiguous frames are arbitrarily selected in each block, a combination of identification patterns assigned to the contiguous frames is different from combinations of identification patterns assigned to any other contiguous frames in the block, each frame can be located by two contiguous identification patterns.

At this time, the identification patterns are assigned in such a manner that, when three contiguous frames are arbitrarily selected, a combination of the identification patterns assigned to the first and last frames of the three contiguous frames is different from combinations of the identification patterns assigned to the first and last frames of any other three contiguous frames, even if one identification pattern of the three contiguous synchronization patterns cannot be correctly detected, each frame can be correctly located by the remaining identification patterns.

By this arrangement, in a data receiver or optical disk unit containing data thus set, if each frame is located based on the identification patterns of two contiguous frames, the frame can be correctly located. Also, if each frame is located based on the identification patterns of three contiguous frames, the frame can be correctly located even when it is difficult to correctly detect identification data.

BRIEF DESCRIPTION OF THE DRAWINGS

FIG. 1 is a chart showing an arrangement of synchronization patterns applied to an optical disk unit according to a first embodiment of the present invention.

FIG. 3 is a chart showing the synchronization patterns in FIG. 1.

FIG. 4 is a chart showing a relationship among contiguous synchronization patterns.

FIG. 5 is a chart showing a relationship among contiguous synchronization patterns with one synchronization pattern interleaved therebetween.

FIG. 7 is a chart showing the arrangement of synchronization patterns applied to an optical disk unit concerned in a second embodiment of this invention, in place of those in FIG. 1.

FIG. 8 is a chart showing the arrangement of synchronization patterns applied to an optical disk unit concerned in a third embodiment of this invention, in place of those in FIG. 1.

FIG. 9 is a chart showing the arrangement of synchronization patterns applied to an optical disk unit concerned in a fourth embodiment of this invention, in place of those in FIG. 1.

FIG. 11 is a chart showing the arrangement of synchronization patterns applied to an optical disk unit concerned in a sixth embodiment of this invention, in place of those in FIG. 1.

FIG. 12 is a chart showing a relationship between synchronization patterns and the number of frames.

FIG. 13 is a chart continued from FIG. 12.

FIG. 14 is a chart showing a relationship between synchronization patterns and the number of frames when the first synchronization pattern is assigned only to a specific sync frame.

DETAILED DESCRIPTION OF THE PREFERRED EMBODIMENTS

Hereinafter, embodiments of the present invention will be described in detail with reference to the drawings.

(1) First Embodiment

Figure 2:
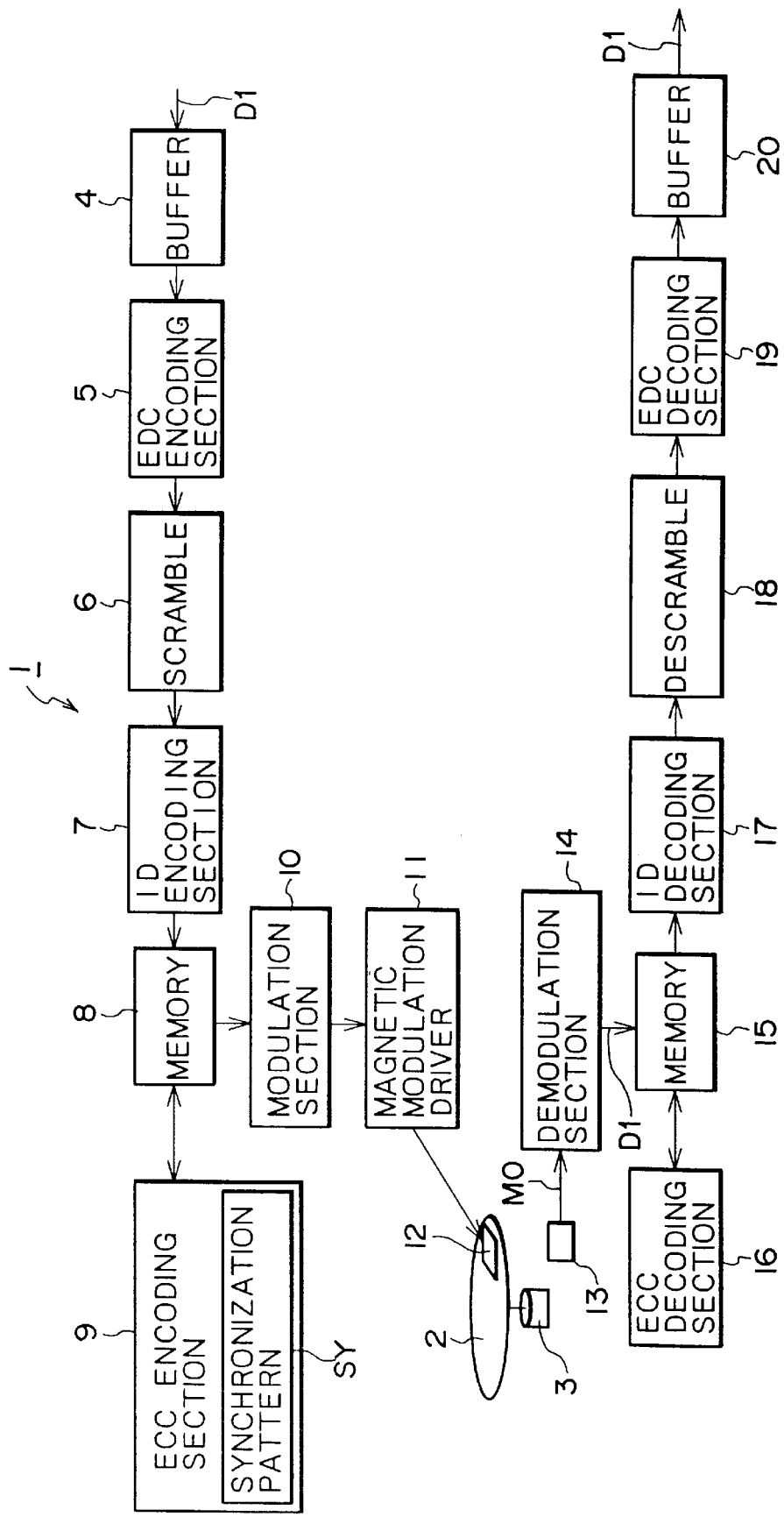
FIG. 2 is a block diagram showing an optical disk unit to which the arrangement in FIG. 1 is applied.

FIG. 2 is a block diagram showing an optical disk unit according to a first embodiment of the present invention. The optical disk unit 1 records AV data D1 on an optical disk 2 and reproduces the AV data D1 recorded on the optical disk 2 for output.

Namely, the optical disk unit 1 transforms a video signal and an audio signal into a digital video signal and a digital audio signal during recording, and then subjects the digital video signal to data compression in accordance with a format defined in MPEG (Moving Picture Experts Group). Moreover, the optical disk unit 1 multiplexes the digital audio signal similarly subjected to data compression and the digital video signal in accordance with a predetermined packet format to generate AV data D1. During reproduction, the optical disk unit 1 reverses the recording process by separating the AV data obtained from an optical disk 2 into digital video signals and digital audio signals before transforming the AV data into the original analog signals and outputting the signals.

The optical disk 2, which is an optical magnetic disk, is rotated at a predetermined rotation speed by a spindle motor 3 on the basis of pre-grooves formed on the information recording surfaces and is subjected to tracking control.

Figure 16:
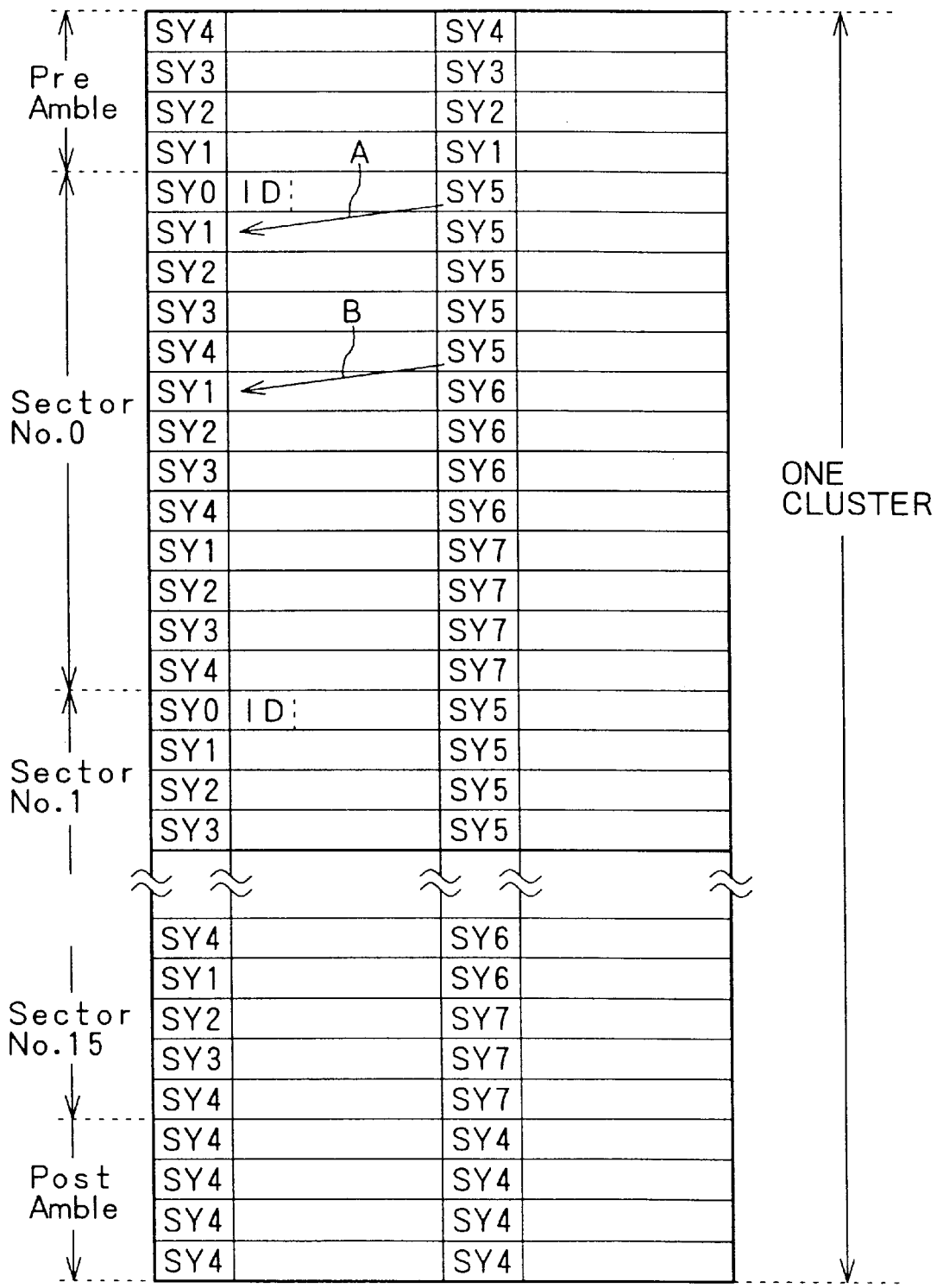
FIG. 16 is a chart showing the structure of clusters in FIG. 15.

In the optical disk unit 1, buffer 4, comprised of large-capacity DRAMs, temporarily stores AV data successively inputted during recording and outputs it in a predetermined block unit constituting a cluster. An EDC encoding section 5 adds a predetermined error detecting code (EDC) to the AV data outputted from the buffer 4 and outputs it. A scrambling circuit 6 performs a scramble process for the AV data and error detecting code outputted from the EDC encoding section 5 and outputs them. An ID encoding section 7 successively adds the ID data described above with regard to FIG. 16 to the output data of the scrambling circuit 6 for output.

A memory 8 temporarily stores the output data of the ID encoding section 7, an error correcting code (ECC) generated based on the output data by the ECC encoding section 9, and the data of synchronization patterns, and outputs them to a modulation section 10 in a predetermined order.

The ECC encoding section 9 generates an error correcting code of product code format with respect to the AV data stored in the memory 8 to output the AV data. At this time, the ECC encoding section 9 outputs the data of a synchronization pattern SY to the memory 8 at a predetermined timing from an internal memory. By this process, the optical disk unit 1 stores in the memory 8 the data of a cluster structure defined with regard to the optical disk unit 1. The optical disk unit 1 forms 16 sectors of data from one cluster of data, and further forms 26 sync frames from the data of each sector.

Each sync frame is selectively assigned one of the eight types of synchronization patterns SY0 to SY7 shown in FIG. 3. The synchronization patterns SY0 to SY7, which are suitable for the synchronization of a PLL circuit, are assigned logical pattern data which has different values respectively and is not found elsewhere. Since the number of types of the synchronization patterns is smaller than the number of frame syncs, an increase in redundancy resulting from assigning the synchronization patterns can be reduced.

The memory 8 outputs AV data, an error correcting code, and synchronization patterns SY0 to SY7 in the format shown in FIG. 1 according to the address control by a control circuit not shown. At this time, the memory 8 sequentially outputs stored data in such a manner that, in part of one sector, no identical combination of synchronization patterns occurs among contiguous sync frames within the sector, as shown in an arrangement of synchronization patterns in FIG. 4, that is, when contiguous frames are arbitrarily selected, a combination of synchronization patterns assigned to the contiguous frames is different from combinations of synchronization patterns assigned to any other contiguous frames. By this arrangement, the memory 8 can locate a sync frame by two contiguous synchronization patterns when contiguous synchronization patterns have been correctly reproduced.

Further, as shown in FIG. 5, for synchronization patterns with one synchronization pattern interleaved therebetween, the memory 8 also outputs stored data in such a manner that, no identical combination of synchronization patterns occurs within one sector, that is, when three contiguous frames are arbitrarily selected, a combination of synchronization patterns assigned to the first and last frames of the three contiguous frames is different from combinations of the synchronization patterns assigned to the first and last frames of any other three contiguous frames. By this arrangement, even when the middle of three contiguous synchronization patterns cannot be correctly reproduced or be incorrectly reproduced, the memory 8 can locate a sync frame by the surrounding synchronization patterns.

By this arrangement, in the above-mentioned contiguous synchronization patterns or synchronization patterns with one synchronization pattern interleaved therebetween, if a design is made so that no identical combination of synchronization patterns occurs within one sector, no identical combination of synchronization patterns will occur within one sector for four contiguous synchronization patterns as well.

By this arrangement, a sync frame can be located for three contiguous synchronization patterns as well, and even when two or more synchronization patterns contiguous at a specific location cannot be correctly detected, a frame sync can be located by synchronization patterns at other locations. Also, by the synchronization patterns of four contiguous frames, even when one of them is incorrectly detected, the incorrectly detected synchronization pattern can be located and a frame sync can be correctly located.

The modulation section 10 receives data outputted from the memory 8 in a predetermined order with a synchronization pattern interleaved, as described above, and outputs the output data after subjecting it to EFM (eight to fourteen modulation), for example. The magnetic modulation driver 11 drives a modulation coil 12 by the output data of the modulation section 10. By this arrangement, the optical disk unit 1 applies a modulated field to a laser beam irradiation position by an optical pickup 13 and thermo-magnetically records the AV data.

By this arrangement, the optical pickup 13 is supported in opposed relation to the modulation coil 12 with respect to the optical disk 2 and is moved in a direction radial to the optical disk 2 by a given sled function so that the optical disk unit 1 can perform a seek operation. The optical pickup 13 irradiates a laser beam onto the optical disk 2 and receives the reflected light, thereby outputting a reproduction signal M0 whose signal level changes in response to the deflection face of the reflected light, a tracking error signal whose signal level changes in response to a tracking error quantity, a focus error signal whose signal level changes in response to a focus error quantity, and a wobble signal whose signal level changes in response to the wobbling of pre-grooves.

By the tracking error signal and focus error signal, the optical disk unit 1 subjects the optical pickup 13 to tracking control and focus control. Also, the optical disk unit 1 performs spindle control on the basis of a wobble signal. Further, the optical pickup 13 intermittently increases the quantity of a laser beam during recording.

A demodulation section 14, during reproduction, generates a clock by a reproduction signal M0 and generates different types of reference signals required to process the reproduction signal M0 on the basis of the clock. Further, the demodulation section 14 binarizes the reproduction signal to generate reproduction data and decodes the reproduction data to output decoded data D1. A memory 15 temporarily stores and outputs the decoded data D1. The ECC decoding section 16 performs error correction processing for the decoded data D1 stored in the memory 15 with an error correcting code added to the decoded data D1.

An ID decoding section 17 receives the decoded data from the memory 15 and detects ID data added to the decoded data. A descrambling circuit 18 descrambles and outputs the decoded data by changing an arrangement of the decoded data on the basis of the detection result of the ID decoding section 17. The EDC decoding section 19 receives the data outputted from the descrambling circuit 18, performs error correction processing with an error correcting code added to the data, and selectively outputs the AV data correctly reproduced. A buffer 20 temporarily stores and outputs the AV data.

Figure 6:
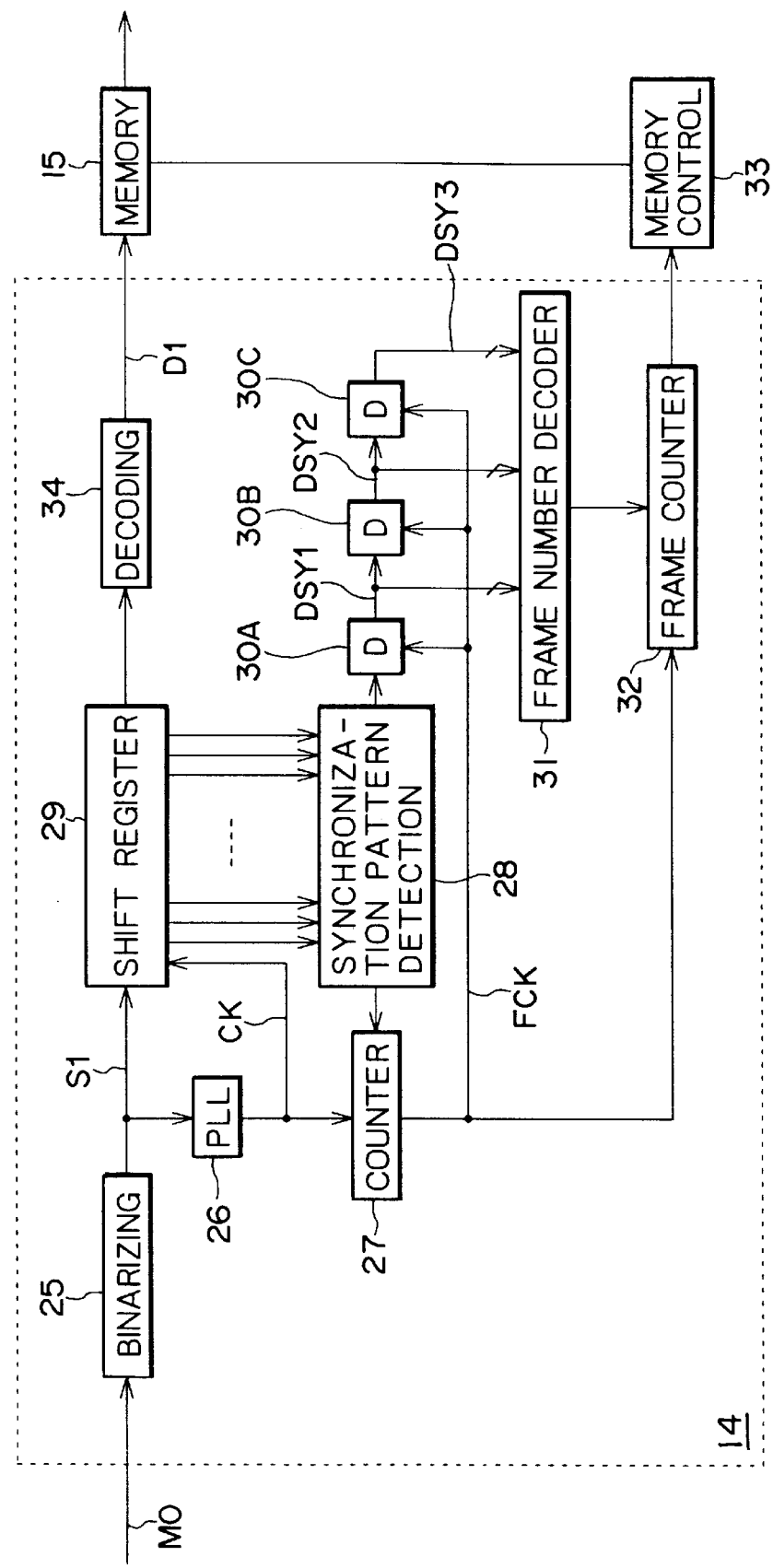
FIG. 6 is a block diagram showing in detail the demodulation section in the optical disk unit in FIG. 2.

FIG. 6 is a block diagram showing the demodulation section 14 in detail. The demodulation section 14 receives the reproduction signal M0 outputted from the optical pickup and carries out waveform equalization by an equalizing circuit not shown. A binarizing circuit 25 binarizes the reproduction signal M0 outputted from the waveform equalization circuit and outputs a binarizing signal S1. A PLL circuit 26 reproduces a clock CK on the basis of the binarizing signal S1. A counter 27, which is a ring counter, counts the clocks CK on the basis of a timing signal outputted from the synchronization pattern detection circuit 28, thereby outputting a frame synchronizing signal FCK whose signal level rises at a timing of a synchronization pattern.

A shift register 29 successively latches the binarizing signals S1 by the clock CK and outputs them. The synchronization pattern detection circuit 28 inputs parallel data as much as the number of bits corresponding to a synchronization pattern from a shift register 29. Further, the synchronization pattern detection circuit 28 accesses an internal memory on the basis of the parallel data and outputs the data outputted from the memory to the counter 27 and a delay circuit (D) 30A.

By this arrangement, when a synchronization pattern appears in the parallel data outputted from the shift register, the synchronization pattern detection circuit 28 resets the counter 27. When a synchronization pattern appears in the parallel data, the synchronization pattern detection circuit 28 outputs numeric data corresponding to the type of the synchronization pattern to the delay circuit 30A, and when no synchronization pattern appears in the parallel data, outputs predetermined numeric data indicating an error to the delay circuit 30A.

The delay circuits 30A to 30C, which are connected in series, input the output data of the synchronization pattern detection circuit 28 to one end at a timing of the frame synchronizing signal FCK and successively transfer the output data at a timing of the frame synchronizing signal FCK.

A frame number decoder 31 inputs the output data DSY1 to DSY3 of the delay circuits 30A to 30C and detects the number of a sync frame corresponding to the output data DSY1 of the delay circuit 30A. A frame counter 32, which is a ring counter for counting the frame synchronizing signal FCKs on the basis of the frame number detected in the frame number decoder 31, successively outputs the number of a sync frame corresponding to the output data DSY1 of the delay circuit 30A to a memory control circuit 33.

Namely, by accessing an internal memory using three pieces of output data DSY1 to DSY3, the frame number decoder 31 detects the number of a sync frame to which the synchronization pattern DSY1 is assigned. If no synchronization pattern can be correctly detected, since a sync frame cannot be located, an evaluation of an error is given. Further, the frame number decoder 31, if a frame number can be detected, loads the frame number into the frame counter 32.

By this arrangement, when correctly detecting contiguous synchronization patterns, the frame number decoder 31 detects a sync frame number equal to the count value of the frame counter 32 and controls the frame counter 32 so as to output a frame number based on the detected number.

On the other hand, in the arrangement described above with regard to FIG. 1, when synchronization patterns which have been correctly detected so far cannot be correctly detected due to a seek operation, detrack, damage, etc. the frame number decoder 31 cannot locate a sync frame number from three contiguous synchronization patterns, resulting in an evaluation result of an error being produced. By this process, the frame number decoder 31 obtains an evaluation result of an error, discontinues loading to the frame counter 32, and outputs the count value of the frame counter 32 to a memory control circuit 33.

Conversely, when a synchronization pattern which could not be correctly detected can be correctly detected upon completion of a seek operation or restoration from detrack, the data DSY1 of a correct synchronization pattern is outputted from the delay circuit 30A in the first sync frame and the data DSY2 and DSY3 of correct synchronization patterns are outputted from the delay circuits 30B and 30C in the following sync frames. By this arrangement, when the frame number decoder 31 obtains an evaluation result of an error from the data DSY1 to DSY3 of the three synchronization patterns, it accesses the internal memory using the data DSY1 and DSY2 of the synchronization patterns as addresses, thereby detecting sync frame numbers from two contiguous synchronization patters and giving an evaluation of an error if they cannot be correctly detected.

Further, when sync frame numbers are thus detected from two synchronization patterns, since it is conceivable that contiguous synchronization patterns were incorrectly detected, the frame number decoder 31 detects continuity between frame numbers detected from two synchronization patterns in a following sync frame, and at the same time continuity among frame numbers detected from three synchronization patterns. If the continuity is correctly detected for a predetermined number of sync frames, the frame number decoder 31 starts loading into the frame counter 32 the frame numbers detected from three synchronization patterns, the loading of which have been stopped.

The memory control circuit 33 controls the address of the memory 15 by the sync frame numbers. A decoding circuit 34 decodes reproduction data outputted from the shift register 29 and outputs decoded data D1.

In the above structure, video signals and audio signals successively inputted to the optical disk unit 1 (FIG. 2) are subjected to data compression respectively and then multiplexed so that AV data D1 is generated. The AV data D1 is inputted in units of clusters via the buffer 4 to the EDC encoding section 5, where error detecting codes are successively provided. After being subjected to a scramble process in the scrambling circuit 6 which follows, the AV data D1 is provided with the ID data indicating a cluster number and a sector number in units of sectors by the ID encoding section 7 and is stored in the memory 8. The AV data D1, after being provided with an error correcting code of product code format by the ECC encoding section 9, is converted into modulation signals in the modulation section 10 and the modulation coil 12 is driven by the magnetic modulation driver 11 in response to the modulation signal, whereby the AV data D1 is thermo-magnetically recorded on the optical disk 2 in units of clusters.

When thus recorded on the optical disk 2, the AV data D1 is selectively provided with eight types of synchronization patterns in units of sync frames by the ECC encoding section 9 and is successively outputted to the modulation section 10 in a predetermined arrangement order (FIG. 1).

In other words, the AV data D1 is assigned the synchronization patterns in such a manner that identical combinations of synchronization patterns are not contiguous within one sector, that is, when contiguous frames are arbitrarily selected, a combination of synchronization patterns assigned to the contiguous frames is different from combinations of synchronization patterns assigned to any other contiguous frames.

Also, for synchronization patterns with one synchronization pattern interleaved therebetween, stored data is outputted in such a manner that, no identical combination of synchronization patterns occurs within one sector, that is, when three contiguous frames are arbitrarily selected, a combination of synchronization patterns assigned to the first and last frames of the three contiguous frames is different from combinations of the synchronization patterns assigned to the first and last frames of any other three contiguous frames.

By these arrangements, the AV data is stored in such a manner that, within one sector, a combination of synchronization patterns assigned to three contiguous frames arbitrarily selected is different from combinations of synchronization patterns assigned to three other contiguous frames. Likewise, the AV data is stored in such a manner that a combination of synchronization patterns assigned to four contiguous frames is different from combinations of synchronization patterns assigned to four other contiguous frames selected in the same way.

On the other hand, during reproduction, in the optical disk unit 1, from a reflected light obtained by irradiating a laser beam onto the optical disk 2, a reproduction signal M0 whose signal level changes in response to the deflection face of the reflected light is obtained, and the reproduction signal M0 is transformed into decoded data D1 in the demodulation section 14. Further, the decoded data D1 is temporarily stored in the memory 15 and is subjected to error correction processing in the ECC decoding section 16, and then ID data is demodulated by the ID decoding section 17 and descrambling is performed by the descrambling circuit 18 on the basis of the ID data. By this process, the AV data D1 recorded on the optical disk 2 is reproduced from the optical disk 2 according to the original arrangement, subjected to error detection processing in the EDC decoding section 19, and outputted by the original analog signals.

By this process, the reproduction signal M0 (FIG. 6) is transformed into a binarizing signal S1 by the binarizing circuit 25 in the demodulation section 14, and then is inputted to the PLL circuit 26, where a clock CK is reproduced on the basis of synchronization patterns, etc. The binarizing signal S1 is inputted to the shift register 29 by the reproduced clock CK and sequentially transferred, so that the reproduction data is demodulated. Further, the reproduction data is processed in the decoding circuit 24 and decoded data D1 is generated.

Parallel data of predetermined bits is inputted to the synchronization pattern detection circuit 28 parallel to a series of processes described above and the timing in which a synchronization pattern appears in the parallel data is detected. Further, the counter 27 for counting a clock CK cyclically in the cycle of synchronization patterns is reset as a result of timing detection by the synchronization pattern detection circuit 28, so that a frame synchronizing signal FCK whose signal level rises in the generation cycle of synchronization patterns is reproduced.

Further, in the synchronization pattern detection circuit 28, the types of synchronization patterns appearing in parallel data are identified and the identification results are successively transferred to the delay circuits 30A, 30B, and 30C which operate in accordance with the frame synchronizing signal FCK. By this process, for three contiguous sync frames, the result of identifying the synchronization patterns is held in the three delay circuits 30A, 30B, and 30C and the result of identifying the three synchronization patterns is inputted to the frame number decoder 31.

In the optical disk unit 1, the internal memory is accessed based on the three identification results in the frame number decoder 31 and the number of a sync frame corresponding to the synchronization pattern DSY1 is detected according to the relationship shown in FIG. 1. Further, the detected sync frame number is set in the frame counter 32 and is successively incremented in response to the frame synchronizing signal FCK, whereby the numbers of sync frames corresponding to the output data D1 of the decoding circuit 34 are successively detected and the address control of the memory control circuit 33 is executed according to the detected numbers. By this process, in the optical disk unit 1, error correction processing or other processing is performed on the basis of synchronization patterns.

In the synchronization pattern processing, if synchronization patterns cannot be correctly detected due to detrack, seek operation, etc., error evaluation results are outputted instead of the synchronization pattern data from the synchronization pattern detection circuit 28. When synchronization patterns cannot be correctly detected, an error will occur in synchronization pattern data outputted from the synchronization pattern detection circuit 28.

In this case, in the frame number decoder 31, an error evaluation result is obtained in one of three synchronization patterns, or synchronization patterns are incorrectly detected. In this embodiment, for the reasons that no identical combination exists for contiguous synchronization patterns within one sector, and that no identical combination exists also for synchronization patterns with one synchronization pattern interleaved therebetween, whether an error evaluation result is inputted or synchronization patterns are incorrectly detected in the frame number decoder 31, it is eventually difficult to locate sync frame numbers. Accordingly, in the optical disk unit 1, the loading of a frame number into the frame counter is discontinued, and the address control of the memory 15 is executed based on a frame number obtained by counting the frame synchronizing signal FCK by the frame counter 32.

On restoration from detrack or completion of a seek operation in this state, since correct synchronization pattern data is successively outputted from the delay circuits 30A, 30B, and 30C, in the optical disk unit 1, sync frame numbers are detected according to the relationship shown in FIG. 1 from the first two contiguous synchronization patterns. In this way, in this embodiment, since no identical combination of two contiguous synchronization patterns exists within one sector, in the optical disk unit 1, as soon as the reproduction of correct synchronization patterns is started, sync frames can be located.

Further, the frame number detection is continued for a predetermined number of frames and continuity is monitored among frame numbers successively detected, so that incorrect detection of synchronization patterns is effectively avoided. Also, sync frame numbers are detected from three contiguous synchronization patterns and continuity is monitored among the sync frame numbers. When sync frames are detected in a correct order for a predetermined number of frames, in the optical disk unit 1, the sync frame numbers are set in the frame counter 32 so that the address control of the memory 15 is executed according to the sync numbers continued from the original sync numbers in the case of detrack, damage, etc. In the case of a seek or track jump operation, the address control of the memory 15 is executed according to the frame number of a seek destination or track jump destination.

In this way, in this embodiment, for two contiguous synchronization patterns with one synchronization pattern interleaved therebetween, as well as two contiguous synchronization patterns, since no identical combination exists within one sector, sync frames can also be located for two contiguous synchronization patterns with one synchronization pattern interleaved therebetween. Namely, even when a middle pattern of three contiguous synchronization patterns is incorrectly detected, sync frames can be easily and correctly located. Accordingly, sync frames can be correctly located by the method for locating sync frames from two contiguous synchronization patterns with one synchronization pattern interleaved therebetween, as required in place of or in addition to the above-mentioned method for locating sync frames from three contiguous synchronization frames or two contiguous synchronization frames.

When sync frames can be located from four contiguous synchronization patterns, if any of them is incorrectly detected, the incorrectly detected synchronization pattern can be located and sync frames can be correctly located.

According to the above structure, to locate each sync frame by assigning synchronization patterns which are fewer in type than the number of sync frames, a sector constituted by sync frames is formed so that, when contiguous frames are arbitrarily selected, a combination of synchronization patterns assigned to the contiguous frames is different from combinations of synchronization patterns assigned to any other contiguous frames, whereby sync frames can be correctly located from two contiguous synchronization patterns, thereby making it possible to easily and correctly locate each frame.

Additionally, each sector is formed so that, when three contiguous frames are arbitrarily selected in the sector, a combination of synchronization patterns assigned to the first and last frames of the three contiguous frames is different from combinations of synchronization patterns assigned to the first and last frames of any other three contiguous frames in the sector, whereby each frame can be easily and correctly located by combining synchronization patterns assigned to the first and last frames as required.

Further, as required, by monitoring synchronization patterns for four contiguous sync frames, even when one of the four contiguous synchronization patterns is incorrectly detected, the incorrectly detected synchronization pattern can be located and each frame can be correctly located.

(2) Second Embodiment

FIG. 7 is a chart showing an arrangement of synchronization patterns concerned in a second embodiment. In this embodiment, in the optical disk unit 1 described above with regard to FIG. 2, AV data is recorded in an arrangement of synchronization patterns shown in FIG. 7 in place of the synchronization patterns in the arrangement described above with regard to FIG. 1.

Here, in this arrangement, nine types of synchronization patterns SY0 to SY8 are assigned to 26 frames constituting one sector. The first synchronization pattern SY0 indicating the start of a sector is placed only in the first frame so that the start of a sector can be located by the first synchronization pattern SY0.

Further, a sector is formed so that, when contiguous frames are arbitrarily selected in the sector, a combination of synchronization patterns assigned to the contiguous frames is different from combinations of synchronization patterns assigned to any other contiguous frames in the sector.

Further, a sector is formed so that, when three contiguous frames are arbitrarily selected in the sector, a combination of synchronization patterns assigned to the first and last frames of the three contiguous frames is different from combinations of synchronization patterns assigned to the first and last frames of any other three contiguous frames.

Synchronization patterns can be arranged as shown in FIG. 7 with the same effect as in the first embodiment. In this case, since the first synchronization pattern SY0 indicating the start of a sector is placed only in the first frame, delimiters between sectors can be easily and correctly detected; for example, sync frames can be located still more easily and correctly by effectively using the sector delimiters.

(3) Third Embodiment

FIG. 8 is a chart showing an arrangement of synchronization patterns concerned in a third embodiment. In this embodiment, in the optical disk unit 1 described above with regard to FIG. 2, AV data is recorded in an arrangement of synchronization patterns shown in FIG. 8 in place of the synchronization patterns in the arrangement described above with regard to FIG. 1.

Here, in this arrangement, nine types of synchronization patterns SY0 to SY8 are assigned to 26 frames constituting one sector. The first synchronization pattern SY0 indicating the start of a sector is placed only in the first frame so that the start of a sector can be located by the first synchronization pattern SY0.

Further, a sector is formed so that, when contiguous frames are arbitrarily selected in the sector, a combination of synchronization patterns assigned to the contiguous frames is different from combinations of synchronization patterns assigned to any other contiguous frames in the sector.

Also, a sector is formed so that, when three contiguous frames are arbitrarily selected in the sector, a combination of synchronization patterns assigned to the first and last frames of the three contiguous frames is different from combinations of synchronization patterns assigned to the first and last frames of any other three contiguous frames in the sector.

Synchronization patterns can be arranged as shown in FIG. 8 with the same effect as in the second embodiment. In comparison with the second embodiment, fewer types of synchronization patterns can contribute to more reduction in redundancy of synchronization patterns as required.

(4) Fourth Embodiment

FIG. 9 is a chart showing an arrangement of synchronization patterns concerned in a fourth embodiment. In this embodiment, in the optical disk unit 1 described above with regard to FIG. 2, AV data is recorded in an arrangement of synchronization patterns shown in FIG. 9 in place of the synchronization patterns in the arrangement described above with regard to FIG. 1.

Here, in this arrangement, six types of synchronization patterns SY0 to SY5 are assigned to 26 frames constituting one sector. The first synchronization pattern SY0 indicating the start of a sector is placed only in the first frame so that the start of a sector can be located by the first synchronization pattern SY0.

Further, a sector is formed so that, when contiguous frames are arbitrarily selected in the sector, a combination of synchronization patterns assigned to the contiguous frames is different from combinations of synchronization patterns assigned to any other contiguous frames in the sector.

Also, a sector is formed so that, when three contiguous frames are arbitrarily selected in the sector, a combination of synchronization patterns assigned to the first and last frames of the three contiguous frames is different from combinations of synchronization patterns assigned to the first and last frames of any other three contiguous frames.

According to the structure shown in FIG. 9, still more reduction of the types of synchronization patterns as well as the same effect as in the third embodiment can contribute to more reduction in redundancy of synchronization patterns as required.

(5) Fifth Embodiment

Figure 10:
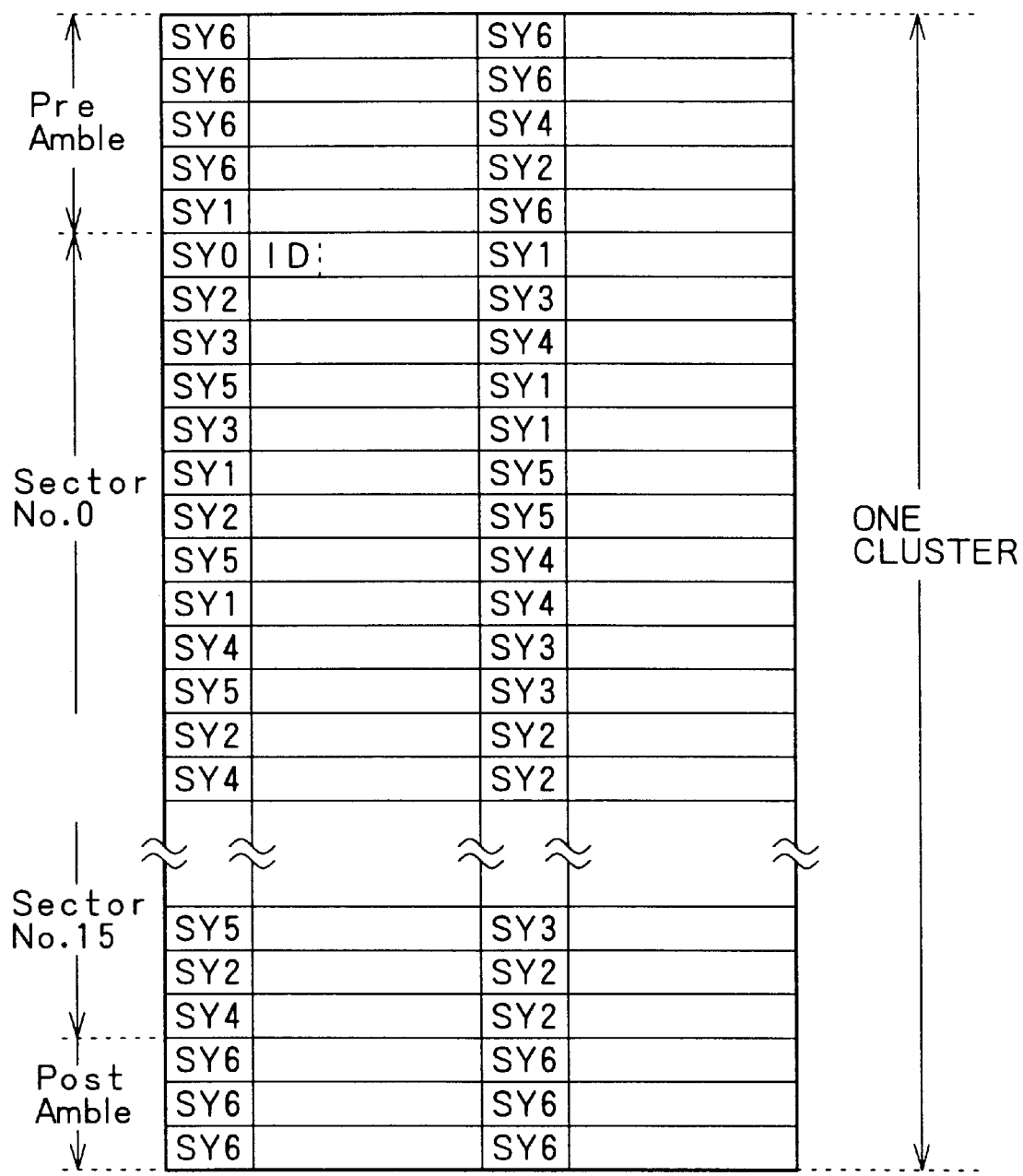
FIG. 10 is a chart showing the arrangement of synchronization patterns applied to an optical disk unit concerned in a fifth embodiment of this invention, in place of those in FIG. 1.
Figure 15:
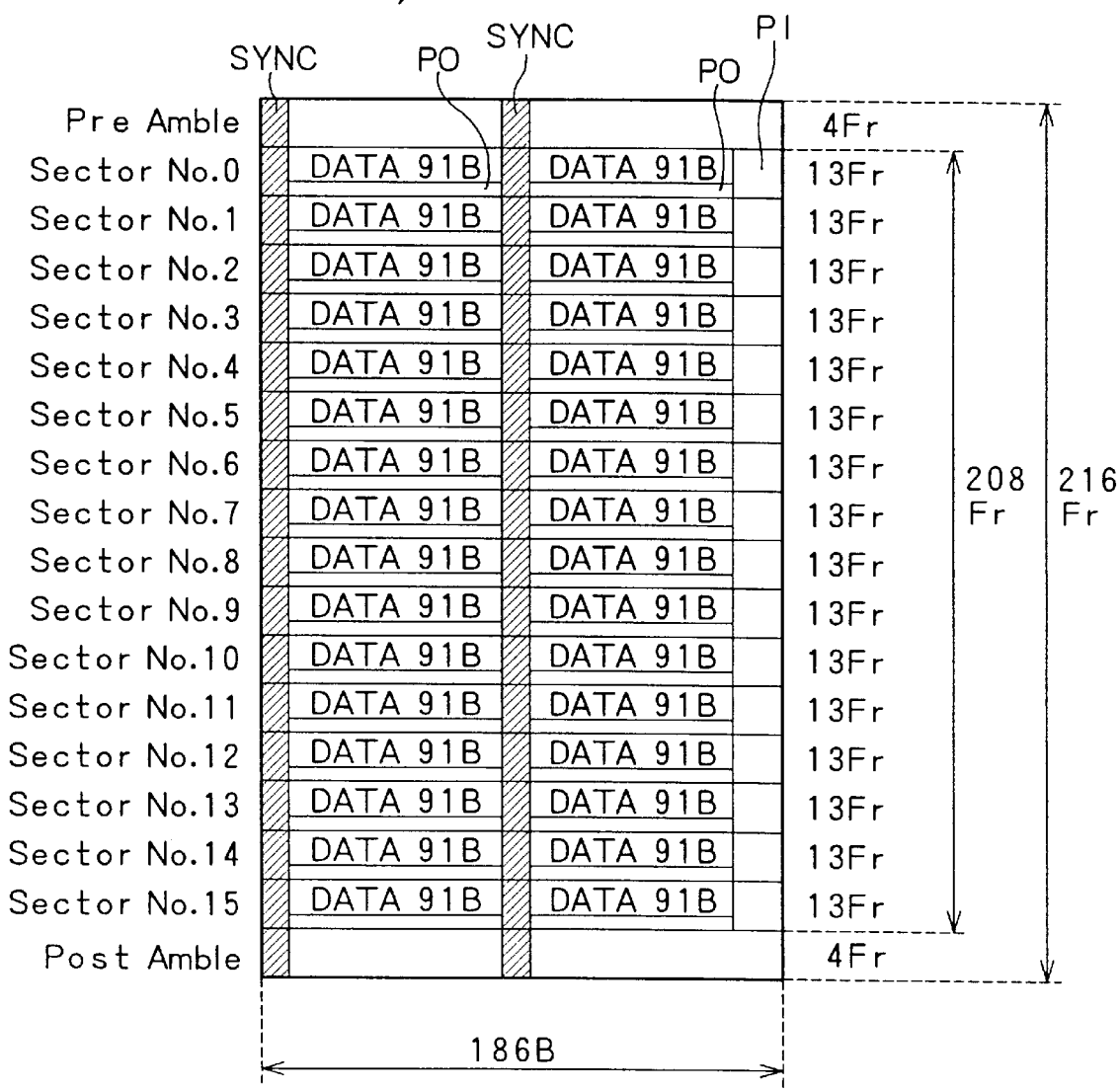
FIG. 15 is a chart showing the structure of clusters in a conventional optical disk unit.

FIG. 10 is a chart showing an arrangement of synchronization patterns concerned in a fifth embodiment of this invention. In this embodiment, in the optical disk unit 1 described above with regard to FIG. 2, AV data is recorded in an arrangement of synchronization patterns shown in FIG. 10 in place of the synchronization patterns in the arrangement described above with regard to FIG. 1.

Here, each sector is formed with the synchronization patterns SY0 to SY5 placed in the arrangement concerned in the above-mentioned fourth embodiment. On the other hand, a preamble and a postamble are formed in such a manner that predetermined data, not AV data, is assigned in units of sync frames and a synchronization pattern is assigned to each sync frame. The preamble and postamble consist of 10 and 6 sync frames, respectively.

A preamble thus formed begins with a contiguous sequence of seventh synchronization patterns SY6 not placed in sectors so that the start of a cluster can be easily detected. Then, the preamble is followed by the synchronization patterns SY4, SY2, and so on except the seventh synchronization pattern SY6 so that the closer the preamble is to the first sector, the more detailed position in the preamble can be determined.

On the other hand, a postamble consists of a repetition of the seventh synchronization patterns SY6 so that the end of a cluster can be easily located.

According to the structure shown in FIG. 10, in each sector, sync frames can be located in the same way as in the fourth embodiment, and the starting position and the ending position of a cluster can be easily determined in units of clusters.

(6) Sixth Embodiment

FIG. 11 is a chart showing an arrangement of synchronization patterns concerned in a sixth embodiment of this invention. In this embodiment, in the optical disk unit 1 described above with regard to FIG. 2, AV data is recorded in an arrangement of synchronization patterns shown in FIG. 11 in place of the synchronization patterns in the arrangement described above with regard to FIG. 1.

Here, a postamble is formed with the same arrangement as that in the fifth embodiment and a preamble is formed with an arrangement similar to the arrangement concerned in the fifth embodiment.

On the other hand, each sector is formed so that, when contiguous frames are arbitrarily selected in the sector, a combination of synchronization patterns assigned to the contiguous frames is different from combinations of synchronization patterns assigned to any other contiguous frames in the sector, and so that, when three contiguous frames are arbitrarily selected in the sector, a combination of synchronization patterns assigned to the first and last frames of the three contiguous frames is different from combinations of synchronization patterns assigned to the first and last frames of any other three contiguous frames in the sector.

Further, each sector is split into subblocks in units of multiple frames; the second, third, and fourth synchronization patterns SY1, SY2, and SY3 are assigned in a subblock from the first to fifth frames, and the second, third, and fifth synchronization patterns SY1, SY2, and SY4 are assigned in a subblock from the sixth to tenth frames. Further, the second, fifth, and sixth synchronization patterns SY1, SY4, and SY5 are assigned in a subblock from the 11th to 15th frames, and the fourth, fifth, and sixth synchronization patterns SY3, SY4, and SY5, and the third, fourth, and sixth synchronization patterns SY2, SY3, and SY5 are assigned in a subblock from the 16th to 20th frames and a subblock from the 21st to 24th frames, respectively.

By this arrangement, synchronization patterns are successively assigned in each sector in such a manner that at least one type of synchronization patterns assigned to a subblock arbitrarily selected is different from the types of synchronization patterns assigned to other subblocks.

According to the structure shown in FIG. 11, in addition to the structure in the first embodiment, there is provided a structure in which synchronization patterns are successively assigned in each sector in such a manner that at least one type of synchronization patterns assigned to a subblock arbitrarily selected is different from the types of synchronization patterns assigned to other subblocks. As a result, in addition to the effect in the first embodiment, sync frame detection accuracy can be improved. That is, in this case, if rough positions of sync frames can be determined, incorrect detection of synchronization patterns can be discovered by the types of the synchronization patterns detected, so that sync frame detection accuracy can be improved.

(7) Other Embodiments

Although a description has been made, in the above-mentioned embodiments, of cases where one sector is constituted by 26 sync frames, this invention, not limited to this, is widely applicable to cases where one block is constituted by different numbers of sync frames. That is, FIGS. 12 and 13 are charts showing the minimum numbers (i) of synchronization patterns required and specific examples (synchronization pattern arrangements) when the number (n) of sync frames is successively changed so that no identical combination exists within one sector for two contiguous patterns and two synchronization patterns with one synchronization pattern interleaved therebetween.

In the charts, the type of a sync pattern is indicated by a number. In the examples shown in FIGS. 12 and 13, the first synchronization pattern (0) is assigned to the starting frame of a sector and other frames. The arrangements are formed so that no identical combination exists for two contiguous patterns and two synchronization patterns with one synchronization pattern interleaved therebetween, also between the synchronization patterns in the sector and a synchronization pattern placed in the start of a following sector which is formed by repeating the arrangement of synchronization patterns in the sector, whereby the start of a sector can be easily and correctly detected.

The charts show that, if settings are made so that at least the relation $n^{1/2} < i$ is satisfied, sync frames can be easily and correctly located as in the above-mentioned embodiments by a small number of synchronization patterns. By the way, to reduce an increase in redundancy resulting from an increased number of synchronization patterns to a practical extent, the relation $2n^{1/2} > i$ must also be satisfied. By this arrangement, eventually, by setting the number (i) of synchronization patterns in the range from $n^{1/2}$ to $2n^{1/2}$ (where n is the number of frames), the same effect as in the above-mentioned embodiments can be obtained.

FIG. 14 is a chart showing the minimum numbers (i) of synchronization patterns required and specific examples (synchronization pattern arrangements) when the number (n) of sync frames is successively changed under the condition in which the first synchronization pattern (0) is set only in the first frame of each sector, in addition to the conditions in FIGS. 12 and 13.

In such a case where the first synchronization pattern (0) is placed only in the starting frame of each sector, it is seen that, if the number of frames is set so that at least the relation $(n-1)^{1/2}+1<i$ is satisfied, sync frames can be easily and correctly located as in the above-mentioned embodiments by a small number of synchronization patterns, except when 2 is set as the number of sync frames. Since a practical upper limit value is about $2((n-1))^{1/2}+1)$, the same effect as in the above-mentioned embodiment can be obtained by setting the number (i) of synchronization patterns in the range from $(n-1)^{1/2}+1$ to $2((n-1))^{1/2}+1)$.

Although a description has been made, in the above-mentioned embodiments, of cases where the synchronization patterns explained in FIG. 3 are placed, this invention, not limited to this, is widely applicable to a variety of synchronization patterns. By the way, in the arrangement shown in FIG. 7 described above with regard to the second embodiment, since the first to fifth synchronization patterns are assigned to odd frames and the sixth to ninth synchronization patterns are assigned to even frames, even if the length of synchronization patterns is changed between odd and even frames, the same effect as in the above-mentioned embodiments can be obtained.

Although a description has been made, in the above-mentioned embodiments, of cases where sync frames are located from two contiguous synchronization patterns and three contiguous synchronization patterns, this invention, not limited to this, is also applicable to a case where sync frames are located from four contiguous synchronization frames.

Further, although a description has been made, in the above-mentioned embodiments, of cases where no identical combination exists, within one sector, for two contiguous synchronization patterns and two synchronization patterns with one synchronization pattern interleaved therebetween, this invention is not limited to this; if there is no problem in practical use, setting may be made so that no identical combination exists within one sector, only for two contiguous synchronization patterns.

Although a description has been made, in the above-mentioned embodiments, of cases where each frame is located from synchronization patterns and the synchronization of the PLL circuit can be taken, this invention, not limited to this, is widely applicable to identification patterns for locating sync frames.

Further, although a description has been made, in the above-mentioned embodiments, of cases where AV data is thermo-magnetically recorded on an optical disk, this invention, not limited to this, is widely applicable to the recording of AV data and various data on a phase-change type optical disk and Write Once optical disk.

Although a description has been made, in the above-mentioned embodiments, of cases where this invention applies to an optical disk unit, this invention, not limited to this, is also widely applicable to cases where desired data is transmitted via various transmission lines such as magnetic recording media.

Although a description has been made, in the above-mentioned embodiments, of cases where desired data is recorded on recording media comprising optical disks, this invention, not limited to this, is also widely applicable to reproduction only recording media.

As described above, according to this invention, at least contiguous synchronization patterns or/and contiguous synchronization patterns with one synchronization pattern interleaved therebetween are assigned with unique combinations, whereby each frame can be easily and correctly located.

What is claimed is:

1. A recording medium comprising data recorded in a block, wherein said block is split into a plurality of frames and a plurality of synchronization patterns are successively assigned to said plurality of frames to record said data, said plurality of synchronization patterns being fewer in type than a quantity of said plurality of frames constituting said block; and wherein, in said block, said plurality of synchronization patterns are assigned in such a manner that when contiguous frames of said plurality of frames are arbitrarily selected, a combination of said plurality of synchronization patterns assigned to said contiguous frames is different from combinations of said plurality of synchronization patterns assigned to any other contiguous frames of said plurality of frames.

2. The recording medium according to claim 1, wherein, in said block, said plurality of synchronization patterns are assigned in such a manner that, when three contiguous frames of said plurality of frames are arbitrarily selected, a combination of said plurality of synchronization patterns assigned to first and last frames of said three contiguous frames is different from combinations of said plurality of synchronization patterns assigned to first and last frames of any other three contiguous frames of said plurality of frames.

3. The recording medium according to claim 2, wherein a quantity of types of said plurality of synchronization patterns is set in a range from $n^{1/2}$ to $2n^{1/2}$, where n is said quantity of said plurality of frames.

4. The recording medium according to claim 2, wherein a quantity of types of said plurality of synchronization patterns is set in a range from $(n-1)^{1/2}+1$ to $2((n-1)^{1/2}+1)$, where n is a quantity of said plurality of frames; and wherein one of said plurality of synchronization patterns is assigned only to a specific frame of said block.

5. The recording medium according to claim 2, wherein said block is split into a plurality of subblocks and said plurality of synchronization patterns are assigned in such a manner that at least one type of said plurality of synchronization patterns assigned to a subblock arbitrarily selected is different from that of said plurality of synchronization patterns assigned to other of said plurality of subblocks.

6. A data generation apparatus for generating data in a block from input data, comprising:

a memory configured to store a plurality of synchronization patterns; and a control circuit, coupled to said memory, configured to split said input data into a plurality of frames, and to successively assign said plurality of synchronization patterns to said plurality of frames to form said block, wherein said plurality of synchronization patterns are fewer in type than a quantity of said plurality of frames, and wherein, in said block, said plurality of synchronization patterns are assigned in such a manner that, when contiguous frames of said plurality of frames are arbitrarily selected, a combination of said plurality of synchronization patterns assigned to said contiguous frames is different from combinations of said plurality of synchronization patterns assigned to any other contiguous frames of said plurality of frames.

7. The data generation apparatus according to claim 6, wherein said plurality of synchronization patterns are assigned in such a manner that, when three contiguous frames of said plurality of frames are arbitrarily selected, a combination of said plurality of synchronization patterns assigned to first and last frames of said three contiguous frames is different from combinations of said plurality of synchronization patterns assigned to first and last frames of any other three contiguous frames of said plurality of frames.

8. The data generation apparatus according to claim 7, wherein a quantity of types of said plurality of synchronization patterns is set in a range from $n^{1/2}$ to $2n^{1/2}$, where n is said quantity of said plurality of frames.

9. The data generation apparatus according to claim 7, wherein a quantity of types of said plurality of synchronization patterns is set in a range from $(n-1)^{1/2}+1$ to $2((n-1)^{1/2}+1)$, where n is said quantity of said plurality of frames; and wherein one of said plurality of synchronization patterns is assigned only to a specific frame of said block.

10. The data generation apparatus according to claim 7, wherein said block is split into a plurality of subblocks each constituted by a subplurality of said plurality of frames, and said plurality of synchronization patterns are assigned in such a manner that at least one type of said plurality of synchronization patterns assigned to an arbitrarily selected subblock of said plurality of subblocks is different from that of said plurality of synchronization patterns assigned to other of said plurality of subblocks.

11. The data generation apparatus according to claim 7, wherein a plurality of blocks including said block are preceded by a postamble and followed by a preamble, and said data is generated in units of said postamble, said plurality of blocks, and said preamble;

wherein a second plurality of frames are formed with predetermined data in place of said input data, and said postamble and said preamble are formed by placing said plurality of synchronization patterns in each of said second plurality of frames; and wherein said plurality of synchronization patterns are placed so that said preamble begins with a contiguous sequence of an identical type of said plurality of synchronization patterns.

12. The data generation apparatus according to claim 7, wherein a plurality of blocks including said block are preceded by a postamble and followed by a preamble, and said data is generated in units of said postamble, said plurality of blocks, and said preamble;

wherein a second plurality of frames are formed with predetermined data in place of said input data, and said postamble and said preamble are formed by placing said plurality of synchronization patterns in each of said second plurality of frames; and wherein said plurality of synchronization patterns are placed so that an identical type of said plurality of synchronization patterns continues in said postamble.

13. A data reproducer for reproducing data generated in a block, wherein said block was split into a plurality of frames and a plurality of synchronization patterns were successively assigned to said plurality of frames at generation, said plurality of synchronization patterns being fewer in type than a quantity of said plurality of frames constituting said block, said data reproducer comprising:

a memory configured to store a contiguous subset of said plurality of synchronization patterns, wherein the contiguous subset of synchronization patterns are associated with a contiguous subset of said plurality of frames; and a frame number decoder, coupled to said memory, configured to determine one or more frame numbers corresponding to the contiguous subset of synchronization patterns and thereby to the contiguous subset of frames, wherein, in said block, said plurality of synchronization patterns were assigned in such a manner that, when contiguous frames of said plurality of frames are arbitrarily selected, a combination of said plurality of synchronization patterns assigned to said contiguous frames is different from combinations of said plurality of synchronization patterns assigned to any other contiguous frames of said plurality of frames.

14. The data reproducer according to claim 13, wherein, in said block, said plurality of synchronization patterns are assigned in such a manner that, when three contiguous frames of said plurality of frames are arbitrarily selected, a combination of said plurality of synchronization patterns assigned to first and last frames of said three contiguous frames is different from combinations of said plurality of synchronization patterns assigned to first and last frames of any other three contiguous frames of said plurality of frames.

15. An optical disk unit for recording data in a block from input data, comprising:

a memory configured to store a plurality of synchronization patterns; and a control circuit, coupled to said memory, configured to split said input data into a plurality of frames, and to successively assign said plurality of synchronization patterns to said plurality of frames to form said block, wherein said plurality of synchronization patterns are fewer in type than a quantity of said plurality of frames, and wherein, in said block, said plurality of synchronization patterns are assigned in such a manner that, when contiguous frames of said plurality of frames are arbitrarily selected, a combination of said plurality of synchronization patterns assigned to said contiguous frames is different from combinations of said plurality of synchronization patterns assigned to any other contiguous frames of said plurality of frames.

16. The optical disk unit according to claim 15, wherein said plurality of synchronization patterns are assigned in such a manner that, when three contiguous frames of said plurality of frames are arbitrarily selected, a combination of said plurality of synchronization patterns assigned to first and last frames of said three contiguous frames is different from combinations of said plurality of synchronization patterns assigned to first and last frames of any other three contiguous frames of said plurality of frames.

17. The optical disk unit according to claim 16, wherein a quantity of types of said plurality of synchronization patterns is set in a range from $n^{1/2}$ to $2n^{1/2}$, where n is said quantity of said plurality of frames.

18. The optical disk unit according to claim 16, wherein a quantity of types of said plurality of synchronization patterns is set in a range from $(n-1)^{1/2}+1$ to $2((n-1)^{1/2}+1)$, where n is said quantity of said plurality of frames; and wherein one of said plurality of synchronization patterns is assigned only to a specific frame of said block.

19. The optical disk unit according to claim 16, wherein said block is split into a plurality of subblocks each constituted by a subset of said plurality of frames, and plurality of synchronization patterns are assigned in such a manner that at least one type of said plurality of synchronization patterns assigned to a subblock arbitrarily selected is different from that of said plurality of synchronization patterns assigned to other of said plurality of subblocks.

20. The optical disk unit according to claim 16, wherein a plurality of blocks including said block are preceded by a postamble and followed by a preamble, and said data is recorded in units of said postamble, said plurality of blocks, and said preamble;
  wherein a second plurality of frames are formed with predetermined data in place of said input data, and said postamble and said preamble are formed by placing said plurality of synchronization patterns in each of said second plurality of frames; and
  wherein said preamble is formed to begin with a contiguous sequence of an identical type of said plurality of synchronization patterns.

21. The optical disk unit according to claim 16, wherein a plurality of blocks including said block are preceded by a postamble and followed by a preamble, and said data is recorded in units of said postamble, said plurality of blocks, and said preamble;
  wherein a second plurality of frames are formed with predetermined data in place of said input data, and said postamble and said preamble are formed by placing said plurality of synchronization patterns in each of said second plurality of frames; and
  wherein said plurality of synchronization patterns are placed so that an identical type of said plurality of synchronization patterns continues in said postamble.

22. An optical disk unit for reproducing data recorded on an optical disk in a block, wherein said block was split into a plurality of frames and a plurality of synchronization patterns were successively assigned to said plurality of frames at recording, said plurality of synchronization patterns being fewer in type than a quantity of said plurality of frames constituting said block, said optical disk unit comprising:
  a memory configured to store a contiguous subset of said plurality of synchronization patterns, wherein the contiguous subset of synchronization patterns are associated with a contiguous subset of said plurality of frames; and
  a frame number decoder, coupled to said memory, configured to determine one or more frame numbers corresponding to the contiguous subset of synchronization patterns and thereby to the contiguous subset of frames,
  wherein, in said block, said plurality of synchronization patterns were assigned in such a manner that, when contiguous frames of said plurality of frames are arbitrarily selected, a combination of said plurality of synchronization patterns assigned to said contiguous frames is different from combinations of said plurality of synchronization patterns assigned to any other contiguous frames of said plurality of frames.

23. The optical disk unit according to said 22, wherein, in said block, said plurality of synchronization patterns are assigned in such a manner that, when three contiguous frames of said plurality of frames are arbitrarily selected, a combination of said plurality of synchronization patterns assigned to first and last frames of said three contiguous frames is different from combinations of said plurality of synchronization patterns assigned to first and last frames of any other three contiguous frames of said plurality of frames.

* * * * *